(No Model.)

R. W. E. MacIVOR.
APPARATUS FOR TREATING NIGHT SOIL.

No. 361,367. Patented Apr. 19, 1887.

Witnesses,
Geo. H. Strong.
J. H. Towne.

Inventor,
R. W. E. MacIvor.
By Dewey & Co.
attys

United States Patent Office.

RALPH W. E. MacIVOR, OF SYDNEY, NEW SOUTH WALES, AUSTRALIA.

APPARATUS FOR TREATING NIGHT-SOIL.

SPECIFICATION forming part of Letters Patent No. 361,367, dated April 19, 1887.

Application filed October 15, 1886. Serial No. 216,362. (No model.)

*To all whom it may concern:*

Be it known that I, RALPH WALDO EMERSON MACIVOR, of Sydney, New South Wales, Australia, have invented an Improvement in the Process of and Apparatus for Treating Night-Soil for the Manufacture of Merchantable Commodities; and I hereby declare the following to be a full, clear, and exact description thereof.

My invention relates to the treatment of night-soil, so that its products are merchantable commodities, as I shall hereinafter fully describe.

The object of my invention is to profitably dispose of night-soil.

Figure 1:
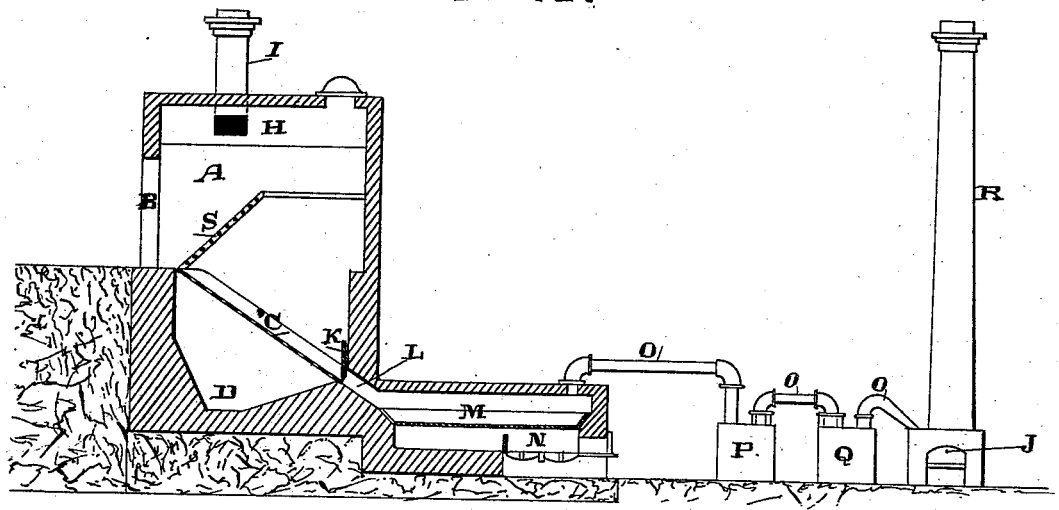
Figure 2:
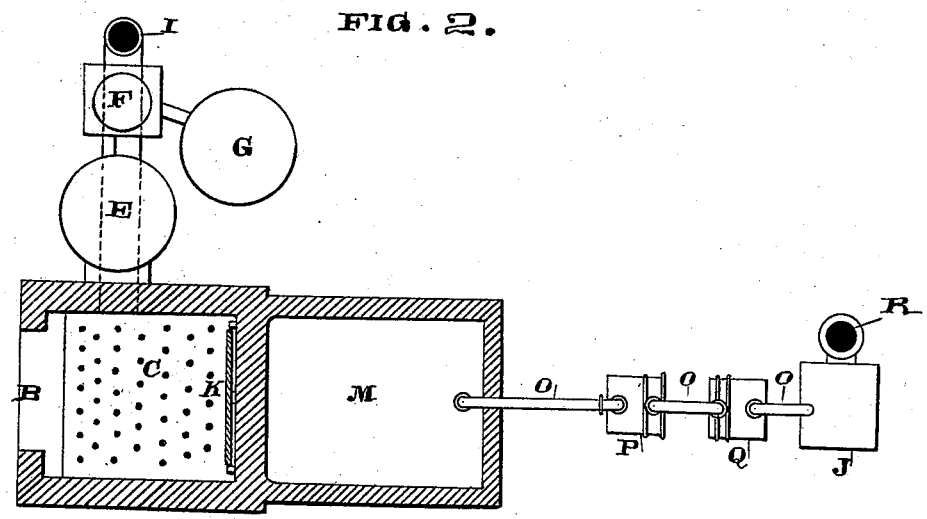

Referring to the accompanying drawings, Figure 1 is a section of my apparatus. Fig. 2 is a plan of same.

The night-soil is introduced in the chamber A through the entrance or doorway B, and after passing through the inclined grating S in said chamber, which has a tendency to disintegrate and more evenly distribute it, it falls upon the inclined plate or floor C, which plate or floor is provided with numerous holes or perforations, through which the fluid portion of the night-soil filters and passes into the trough, gutter, or reservoir D, which in its turn communicates with the tank or reservoir E, from which it (*i. e.*, the liquid drainings of the night-soil) can, when desired, be drawn off into the vessel or still F, where it is boiled down with lime or other alkaline substances to at least two-thirds of its volume. The resulting ammonia is caught or absorbed in dilute sulphuric acid contained in a suitably-constructed tank or reservoir, G. The chamber A is provided with the ventilating-pipe H, which communicates with the fire-place of the chimney-stack I. The solid soil remaining on the floor or plate C passes by gravity and without handling into the pan or hearth M of inclosed drying-place upon raising the movable iron door K by means of a lever or other arrangement from the outside of the chamber A or at the entrance of the passage L.

The hearth or pan M is heated from below by the furnace N, and the water-ammonia and noxious gases are drawn through the escape pipe or pipes O into a vessel, P, containing lime for purification from sulphuric compounds, thence into a reservoir, Q, containing sulphuric or other acids or chemicals capable of uniting with ammonia. The unboiled or uncaught part of such gases (if any) finally passes through the fire-place J of the chimney-stack R.

The products of the process are a manure of marketable value and sulphate of ammonia.

The dimensions of the various parts of the entire plant will vary according to circumstances.

The liquid part of the night-soil, instead of being utililized in the manner explained above, may be run into settling tanks or vats, and treated with a precipitant composed of lime and clay mixed in the proportions requisite to make cement, the resulting precipitate being dried and calcined, so as to yield cement and ammonia.

Having thus described my invention, what I claim as new, and desire to secure by Letters Patent, is—

1. In an apparatus for the treatment of night-soil for the production of merchantable commodities, a chamber for the reception of the material, an inclined perforated plate or floor in said chamber upon which the material is fed and by which the liquid is separated from the solid matter, and a heating pan or hearth with which the lower end of the inclined plate or floor communicates and in which the solid matter is dried to a manure, substantially as described.

2. In an apparatus for the treatment of night-soil for the production of merchantable commodities, the chamber A, for the reception of the material, having the inclined perforated floor or plate C, by which the liquid is separated from the solid matter, the pan or hearth M, receiving the solid matter from the inclined plate or floor, and means for heating said pan or hearth, the pipes O, for drawing off the water-ammonia and noxious gases from the material on the hearth, and the vessels P Q, in which they are treated for the production of sulphate or other salt of ammonia, substantially as described.

3. In an apparatus for the treatment of night-soil for the production of merchantable commodities, the chamber A, having the inclined perforated plate or floor C, by which the liquid is separated from the solid matter, the pan or hearth M, in which the solid matter is heated to a manure, the pipes O, by which the water-ammonia and noxious gases are drawn off, the vessels P Q, in which these are treated for the production of sulphate or other salt of ammonia, and the fire-place J of the chimney-stack R, by which the uncaught portions of said gases are consumed, substantially as described.

4. In an apparatus for the treatment of night-soil for the production of merchantable commodities, the receiving-chamber A, having the inclined perforated plate or floor C, by which the liquid is separated from the solid matter, the trough, gutter, or reservoir D under the inclined plate or floor, for receiving the liquid matter, the tank E, connected with said trough D, the still F, and sulphuric-acid tank G, all arranged and adapted to operate substantially as described.

5. An apparatus for the treatment of night-soil for the production of merchantable commodities, consisting of the receiving-chamber A, the inclined perforated plate or floor C, for the separation of the liquid from the solid matter, the trough D, into which the liquid matter passes, and the tank E, connected with the trough, the vessel or still F, and the acid-tank G, the heating hearth or pan M, for the reception of the solid matter from the inclined plate or floor C, the pipes O, by which the water-ammonia and noxious gases are drawn off, the vessels P Q, in which the gases are treated, the stack R, having fire-place J, through which the uncaught gases are passed, and the ventilating passage or pipe H and stack I for the receiving-chamber, all arranged and adapted to operate substantially as described.

In witness whereof I have hereunto set my hand.

RALPH W. E. MacIVOR.

Witnesses:
GEORGE F. STUART,
B. HUGHES.